(12) United States Patent
Donley et al.

(10) Patent No.: US 10,963,402 B1
(45) Date of Patent: Mar. 30, 2021

(54) USING AGE MATRICES FOR MANAGING ENTRIES IN SUB-QUEUES OF A QUEUE

(71) Applicant: Advanced Micro Devices, Inc., Santa Clara, CA (US)

(72) Inventors: Gregg Donley, San Jose, CA (US); Mark Silla, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/729,377

(22) Filed: Dec. 28, 2019

(51) Int. Cl.
*G06F 13/16* (2006.01)
*G06F 16/22* (2019.01)

(52) U.S. Cl.
CPC ...... *G06F 13/1642* (2013.01); *G06F 16/2237* (2019.01); *G06F 2213/16* (2013.01)

(58) Field of Classification Search
CPC ...... G06F 3/0656; G06F 3/0659; G06F 5/065; G06F 5/10; G06F 5/12; G06F 5/14; G06F 9/3855; G06F 13/1642; G06F 13/1673; G06F 13/4013; G06F 2213/16; G06F 16/2237

See application file for complete search history.

(56) References Cited

U.S. PATENT DOCUMENTS

| | | | | |
|---|---|---|---|---|
| 5,559,988 A | * | 9/1996 | Durante | G06F 3/0601 711/100 |
| 5,748,978 A | * | 5/1998 | Narayan | G06F 9/30152 712/204 |
| 6,112,267 A | * | 8/2000 | McCormack | G06F 12/08 710/52 |
| 6,175,908 B1 | * | 1/2001 | Pickett | G06F 9/30152 712/204 |
| 6,697,939 B1 | * | 2/2004 | Kahle | G06F 9/30174 712/240 |
| 8,819,312 B2 | * | 8/2014 | Shumsky | G06F 5/16 710/57 |
| 9,021,280 B1 | * | 4/2015 | Prasad | G06F 1/3275 713/320 |
| 2003/0018863 A1 | * | 1/2003 | Hill | G06F 13/1642 711/158 |

(Continued)

FOREIGN PATENT DOCUMENTS

JP 2010218112 A * 9/2010

*Primary Examiner* — Thomas J. Cleary
(74) *Attorney, Agent, or Firm* — Park, Vaughan, Fleming & Dowler LLP

(57) ABSTRACT

An electronic device includes a queue with multiple sub-queues arranged in a logical hierarchy from a lowest sub-queue to a highest sub-queue, each sub-queue including a separate subset of a set of entries of the queue, and a separate age matrix for each sub-queue. The electronic device also includes a controller that stores items in entries in the lowest sub-queue until the lowest sub-queue is full and then stores items in successively next higher sub-queues in the hierarchy. The controller also removes an item that is ready for removal from an entry in the lowest sub-queue. The controller then shifts items in sub-queues in the hierarchy to fill the vacancy in the lowest sub-queue. For the shifting, the controller uses an age matrix associated with each sub-queue to determine an oldest item in that sub-queue and then moves the oldest item to a next lower sub-queue in the hierarchy.

26 Claims, 5 Drawing Sheets

(56) References Cited

U.S. PATENT DOCUMENTS

| | | | | |
|---|---|---|---|---|
| 2008/0320478 | A1* | 12/2008 | Singh | G06F 9/3836 |
| | | | | 718/102 |
| 2009/0019193 | A1* | 1/2009 | Luk | G06F 5/06 |
| | | | | 710/52 |
| 2011/0161601 | A1* | 6/2011 | Vash | G06F 12/0815 |
| | | | | 711/146 |
| 2013/0262725 | A1* | 10/2013 | Ito | G06F 13/364 |
| | | | | 710/113 |
| 2014/0317357 | A1* | 10/2014 | Kaplan | G06F 12/0862 |
| | | | | 711/137 |
| 2017/0293646 | A1* | 10/2017 | Rozario | G06F 16/2365 |
| 2019/0057093 | A1* | 2/2019 | Caulfield | G06F 16/24578 |
| 2019/0163488 | A1* | 5/2019 | Karve | G06F 9/3855 |
| 2019/0391815 | A1* | 12/2019 | McGlone | G06F 9/3855 |
| 2020/0106718 | A1* | 4/2020 | Lesartre | H04L 47/6275 |

* cited by examiner

USING AGE MATRICES FOR MANAGING ENTRIES IN SUB-QUEUES OF A QUEUE

BACKGROUND

Related Art

Some electronic devices use storage circuitry such as queues and buffers for temporarily storing items that are being handled by the electronic devices. For example, some network devices (e.g., switches, routers, etc.) include queues that are used for temporarily buffering network transactions, packets, messages, or other communications that are awaiting processing or transmission to downstream network devices via a network. As another example, processors such as central processing units (CPUs) or graphics processing units (GPUs) can include queues in which instructions, threads, or work items are temporarily stored to await processing or handling by the processor. Such storage circuitry (called "queues" herein) has a number of benefits including hiding latency from communicating functional blocks and devices, conversion between clock domains, etc.

In some electronic devices, items can be removed from queues for handling out of order. In other words, in such electronic devices, items are not required to be removed in strictly in first-in-first-out (FIFO) or age order and instead can be removed, to at least some extent, in any convenient order. For example, a queue in a network device may store older transactions (or packets, messages, etc.) destined for a first downstream network device and newer transactions destined for a second downstream network device. If strictly age-order removal was required, the transactions destined for the first downstream network device would be required to be removed (and handled) first. In contrast, when out of order removal is permitted, the transactions destined for the second downstream network device can be removed first, despite being younger. This can be useful because the network device can make progress in removing the transactions from the queue when the second downstream network device is available, despite the first downstream network device being busy.

Although permitting the out of order removal of items from queues can be beneficial, electronic devices that support out of order removal must also include mechanisms for managing the vacancies in the queues caused by the out of order removal of items. Some electronic devices handle such vacancies by simply shifting the remaining items in the queue so that the vacancy is filled and a vacancy is opened at a "tail" of the queue for the next item to be added to the queue. This technique is straightforward and maintains age order among the items in a queue, but results in a large number of shift operations (especially in larger queues), because the removal of any item from the queue involves shifting as many as all of the remaining items in the queue. Electronic devices that use this technique for handling items in queues therefore consume relatively large amounts of electrical power for operating queues. Other electronic devices use metadata such as pointers, age information, or lists associated with items or entries in queues in order to keep track of the relative ages of items in queues. Although using metadata for keeping track of relative ages of items in queue can enable items to be stored in any location and age order in queues, the metadata must be stored in the queue or elsewhere and lookups must be performed in order to determine relative ages and/or locations of items in the queue. The overhead in terms of circuitry and lookup complexity for the metadata increases with larger queues. For queues above a certain size, the metadata circuitry can consume prohibitive amounts of circuit area and/or the lookup process can consume undesirably high levels of electrical power.

BRIEF DESCRIPTION OF THE FIGURES

Throughout the figures and the description, like reference numerals refer to the same figure elements.

DETAILED DESCRIPTION

Figure 1:
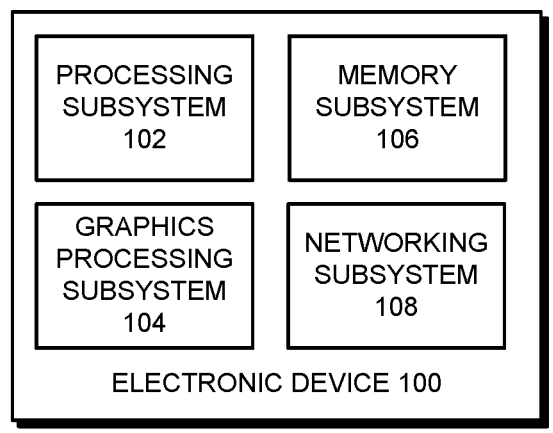
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that this term may have significant additional aspects that are not recited herein for clarity and brevity and thus the description is not intended to limit this term.

Functional block: functional block refers to a group, collection, and/or set of one or more interrelated circuit elements such as integrated circuitry, discrete circuitry, etc. The circuit elements are "interrelated" in that circuit elements share at least one property. For example, the interrelated circuit elements may be included in, fabricated on, or otherwise coupled to a particular integrated circuit chip, substrate, circuit board, or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate or discrete circuit element) to millions or billions of circuit elements (e.g., an integrated circuit memory).

Overview

In the described embodiments, an electronic device includes a queue for storing items that are to be handled in the electronic device. For example, in some embodiments, a networking subsystem in the electronic device includes a network transaction queue that is used for storing network transactions (e.g., packets, requests, etc.) that are awaiting handling (e.g., forwarding, processing, etc.). As another example, in some embodiments, a processing subsystem in the electronic device includes a queue that stores work items (e.g., instructions, threads, interrupts, etc.) that are awaiting handling (e.g., scheduling, processing, etc.). The queue includes a set of multiple separate sub-queues, each sub-queue including a different subset of a set of entries for the queue. For example, the queue may include N entries (where N is 64, 100, or another number) that are divided among M sub-queues (where M is 2, 5, or another number). The sub-queues are included in a logical hierarchy in which the sub-queues are organized from a lowest sub-queue to a highest sub-queue.

In some embodiments, as items are stored in the queue, items are first stored in the lowest sub-queue in the hierarchy until the lowest sub-queue is full and then items are stored in successively higher sub-queues in the hierarchy as each successively higher sub-queue becomes full. In other words, as each sub-queue becomes full of stored items, subsequent incoming items are stored in a next higher sub-queue in the hierarchy. In some embodiments, as items are stored in the individual sub-queues, the items can be stored in any available entry in that sub-queue, so that items are not necessarily stored in a particular order in the entries in that sub-queue.

In some embodiments, a separate age matrix is used for keeping track of the relative ages of items that are stored in each of the sub-queues. Each age matrix includes a number of elements arranged in rows and columns, with each row and each column being associated with a different one of the entries in the corresponding sub-queue. Each row and column includes information about the relative ages of items that are stored in an associated entry in the sub-queue in comparison to items that are stored in some or all of the other entries in the sub-queue. More specifically, each element in an age matrix is used for storing a value that indicates whether the entry in the corresponding sub-queue associated with the row is older than the entry in the corresponding sub-queue associated with the column—or vice versa. In some embodiments, the value is stored in each element in age matrices using a single bit. In some of these embodiments, when the bit in an element in a column of an age matrix is set to 0, the item in the entry associated with the column of the age matrix is older (i.e., less recently added to the entry) than the item in the entry associated with the row. The opposite is true when the bit in an element in a column of an age matrix is set to 0. In some embodiments, the columns and/or rows in an age matrix include or are associated with validity information (e.g., one or more valid bits, etc.). In these embodiments, when an entry in the corresponding sub-queue does not presently store an item, the validity information is set to indicate that the column and/or row is invalid and should not be used for relative age determinations. In some embodiments, the validity information is included in metadata in the entry itself, but is used for handling information in the age matrix.

In some embodiments, as items are stored in entries in a sub-queue, the associated age matrix is updated to reflect the new relative ages of items stored in the sub-queue. For the updating operation, specified elements in columns and/or rows are set or updated. For example, in some embodiments, elements in a column in the age matrix that is associated with the entry in the sub-queue are set to a value such as 1 and elements in a row in the age matrix that is associated with the entry in the sub-queue are set to a value such as 0.

In some embodiments, items that were previously stored in the queue are removed from the queue by being removed from the lowest-sub-queue in the hierarchy—and only from the lowest sub-queue. In some embodiments, any item that is ready for removal can be removed from the lowest sub-queue, including items for which there are one or more older items in the lowest sub-queue. In other words, items can be removed from the lowest sub-queue out of order with regard to other items in the sub-queue as the items are ready for removal. For example, when the queue is a network transaction queue, an item (e.g., a transaction such as a packet or request) destined for a first downstream device can be removed from the queue and forwarded to the first downstream device when the first downstream device is available, despite one or more older items destined for a second downstream device awaiting forwarding in the queue when the second downstream device is busy.

In some embodiments, when an item is removed from the lowest sub-queue, a vacancy is created in the lowest sub-queue—i.e., the entry in the sub-queue that stored the item is freed for storing another item. Items from the higher sub-queues in the hierarchy (assuming such items exist) are then shifted to fill the vacancy in the lowest sub-queue. For this operation, starting from the lowest sub-queue and proceeding through sub-queues in the hierarchy, for each sub-queue, when a next higher sub-queue in the hierarchy exists and stores at least one item, a controller in the electronic device determines, using the age matrix associated with the next higher sub-queue, an entry in which an oldest item in the next higher sub-queue is stored. For example, in some embodiments, the controller finds a column in the age matrix associated with the next higher sub-queue that best meets a criteria for the values in the column, such as the column in which the elements store the smallest number of 1s or the most 0s. The controller then identifies, based on the particular column in the age matrix, the entry in the next higher sub-queue in which the oldest item is stored—i.e., matches the column to the associated entry in the next higher sub-queue. The controller then moves the oldest item from the entry in the next higher sub-queue into the sub-queue. In this way, the controller moves/shifts the oldest item from each higher sub-queue down to the next lower sub-queue in sequence to file the vacancy in each sub-queue.

In some embodiments, multiple items that are ready for removal can be removed from the lowest sub-queue in a single removal operation, including multiple items for which there are one or more older items in the lowest sub-queue. In other words, in these embodiments, two or more items can be removed at a time and out of order from the lowest sub-queue when the items are ready for removal. As with removing a single item from the lowest sub-queue, a corresponding number of items from the higher sub-queues in the hierarchy (assuming such items exist) are shifted to fill the vacancy in the lowest sub-queue.

By using the hierarchy of sub-queues and using age matrices to manage items in the sub-queues, the described embodiments are able to implement larger queues without the shortcomings of other queue implementations. More specifically, by using the hierarchy of sub-queues, the described embodiments are able to avoid the large number of shift operations that are performed in queues that order entries by age using shift operations and are able to avoid the complex and power hungry age metadata circuitry used for larger out-of-order queues. The electronic devices in the described embodiments therefore more efficiently use electrical power and computational resources, which leads to higher user satisfaction with the electronic devices.

Electronic Device

FIG. 1 presents a block diagram illustrating electronic device 100 in accordance with some embodiments. As can be seen in FIG. 1, electronic device 100 includes processing subsystem 102, graphics processing subsystem 104, memory subsystem 106, and networking subsystem 108. Generally, processing subsystem 102, graphics processing subsystem 104, memory subsystem 106, and networking subsystem 108 are functional blocks that are implemented in hardware, i.e., using various circuitry, circuit elements, and devices. For example, processing subsystem 102, graphics processing subsystem 104, memory subsystem 106, and networking subsystem 108 can be entirely fabricated on one or more semiconductor chips, including on one or more separate semiconductor chips, can be fashioned from semiconductor chips in combination with discrete circuit elements, can be fabricated from discrete circuit elements alone, etc. As described herein, some or all of processing subsystem 102, graphics processing subsystem 104, memory subsystem 106, and networking subsystem 108 can perform operations for managing items in queues that include separate sub-queues using respective age matrices.

Processing subsystem 102 is a functional block that performs computational and other operations (e.g., control operations, configuration operations, etc.) in electronic device 100. For example, processing subsystem 102 can be or include one or more microprocessors, central processing unit (CPU) cores, and/or other processing mechanisms. In some embodiments, processing subsystem 102 includes a queue having a number of sub-queues in which items such as threads, instructions, etc. can be stored and managed using age matrices as described herein.

Graphics processing subsystem 104 is a functional block that performs computational and other operations (e.g., control operations, configuration operations, etc.) associated with graphics processing (e.g., rendering, etc.) and/or general purpose computational operations in electronic device 100. For example, processing subsystem 102 can be or include one or more general purpose graphics processing unit (GPGPU) cores, and/or other graphics processing mechanisms. In some embodiments, graphics processing subsystem 104 includes a queue having a number of sub-queues in which items such as threads, instructions, etc. can be stored and managed using age matrices as described herein.

Memory subsystem 106 is functional block that performs operations of a memory (e.g., a "main" memory). Memory subsystem 106 includes volatile and/or non-volatile memory circuits such as fourth-generation double data rate synchronous DRAM (DDR4 SDRAM) and/or other types of memory circuits for storing data and instructions for use by other functional blocks in electronic device 100 and control circuits for handling accesses of the data and instructions that are stored in the memory circuits and for performing other control or configuration operations. In some embodiments, memory subsystem 106 includes a queue having a number of sub-queues in which items such as memory access requests can be stored and managed using age matrices as described herein.

Networking subsystem 108 is a functional block that performs operations for searching for, connecting to, configuring, and communicating on a wired and/or wireless electronic communications network. Networking subsystem 108 includes transceivers, controllers, processors, and/or other circuitry for communicating on the wired and/or wireless network. In some embodiments, networking subsystem 108 includes a queue having a number of sub-queues in which items such as network transactions (e.g., packets, requests, messages, etc.) can be stored and managed using age matrices as described herein.

Electronic device 100 is simplified for illustrative purposes. In some embodiments, however, electronic device 100 includes additional or different functional blocks, subsystems, elements, and/or communication paths. For example, electronic device 100 may include input-output (I/O) subsystems, display subsystems, human interface subsystems, etc. Electronic device 100 generally includes sufficient functional blocks to perform the operations herein described.

Figure 2:
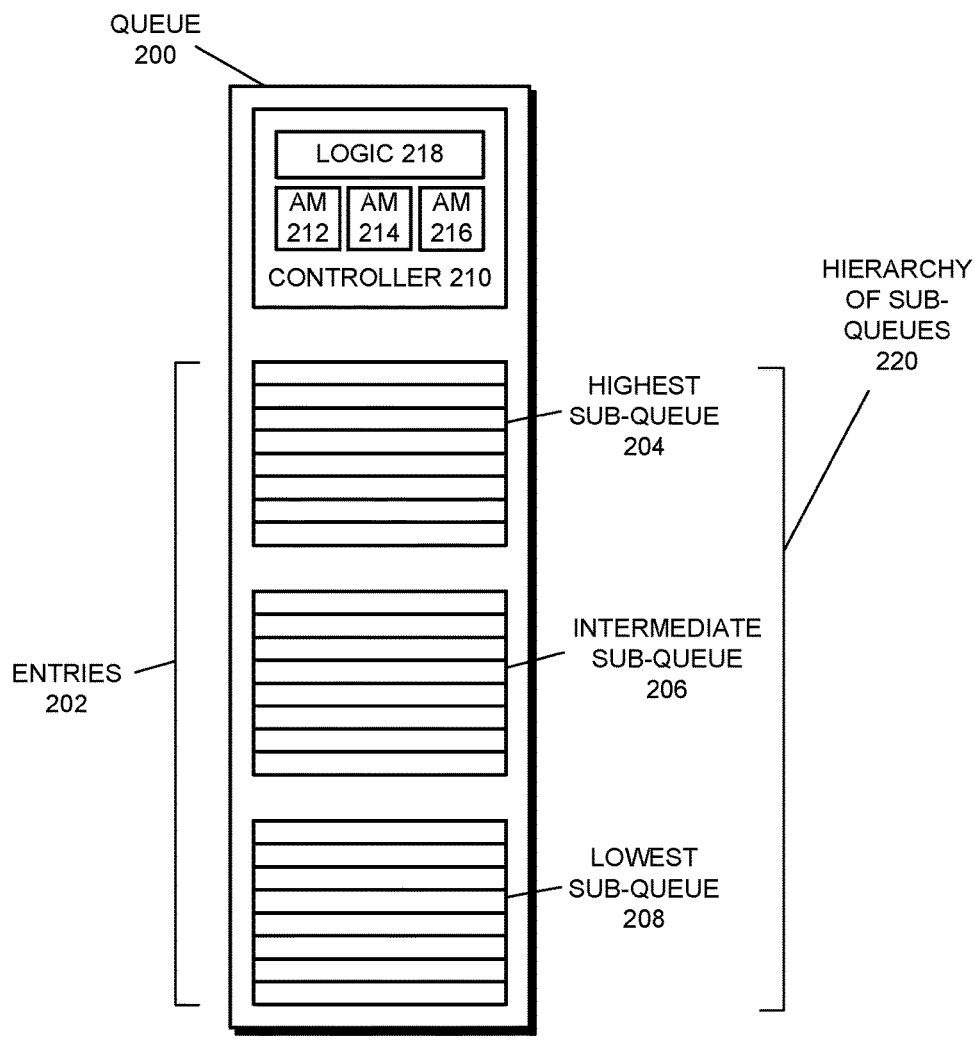
FIG. 2 presents a block diagram illustrating a queue in accordance with some embodiments.

Electronic device 100 can be, or can be included in, any device that performs the operations described herein. For example, electronic device 100 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof Queue In the described embodiments, a queue is used for storing items. For example, in some embodiments, the queue is a network queue in networking subsystem 108 in which network transactions (i.e., the "items") are temporarily buffered before being removed and processed, forwarded, or otherwise handled by networking subsystem 108. As another example, in some embodiments, the queue is a processing queue in processing subsystem 102 in which processing tasks or threads (i.e., the "items") are temporarily stored before being removed and processed or otherwise handled by processing subsystem 102. FIG. 2 presents a block diagram illustrating queue 200 in accordance with some embodiments. As can be seen in FIG. 2, queue 200 includes a set of 24 entries 202. Each entry 202 includes memory circuitry (e.g., flip flops, latches, SRAM memory circuitry, etc.) useable for storing items. For example, in some embodiments, each entry includes memory circuitry for storing a set of bits for items that are up to T bytes in length (e.g., 6, 20, or another number of bytes). In some embodiments, each entry 202 also includes memory circuitry for storing metadata such as validity information, etc. that is used for handling or identifying information (or the lack thereof) in that entry 202. For example, in some embodiments, the validity information is used for controlling when corresponding rows or columns are used for determining the age of items stored in entries 202 as described herein.

Entries 202 in queue 200 are allocated among a logical hierarchy of sub-queues 220 that includes, in order from a highest sub-queue to a lowest sub-queue in the hierarchy, highest sub-queue 204, intermediate sub-queue 206, and lowest sub-queue 208 (collectively, "the sub-queues"). Each of the sub-queues therefore includes a different subset of entries 202—which is shown in FIG. 2 as each of the sub-queues including a different set of 8 of the 24 entries

202. As used herein, "logical hierarchy" indicates that the sub-queues are regarded as part of a hierarchy by controller 210 (and possibly other functional blocks in electronic device 100) for operations such as storing of items in and removal of items from the queue, shifting items among the sub-queues, etc. For example, in some embodiments, items are only removed from lowest sub-queue 208 in queue 200 (and not others of the sub-queues), items are shifted in a downward direction through the hierarchy of sub-queues until being removed from lowest sub-queue 208, items are stored in queue 200 in a lowest sub-queue in which a vacant entry 202 is presently available, etc.

Queue 200 also includes controller 210. Controller 210 is a functional block that performs operations for handling items in queue 200. Controller 210 includes logic 218, which is a functional block having circuitry for performing the operations for handling items in queue 200. For example, in some embodiments, logic 218 performs operations for storing items in queue 200 (i.e., in the sub-queues), removing items from queue 200, receiving items from other functional blocks in electronic device 100 (e.g., processing subsystem 102, etc.), communicating items to other functional blocks in electronic device 100, etc. When storing items in queue 200, logic 218 receives an item, determines a lowest sub-queue in the hierarchy in which an entry is available for storing the item, and stores the item in an available entry in the determined sub-queue. When removing items from queue 200, logic 218 determines that an item is ready for removal in lowest sub-queue 208, acquires the item from an entry in lowest sub-queue 208, and provides the item to a receiving functional block in electronic device 100 (or another entity). After removing an item from lowest sub-queue 208, logic 218 shifts items downward in the hierarchy of sub-queues (assuming such items exist) to fill the vacancy in lowest sub-queue 208. The operations performed by controller 210/logic 218 for handling items in queue 200 are described in more detail below.

Figure 3:
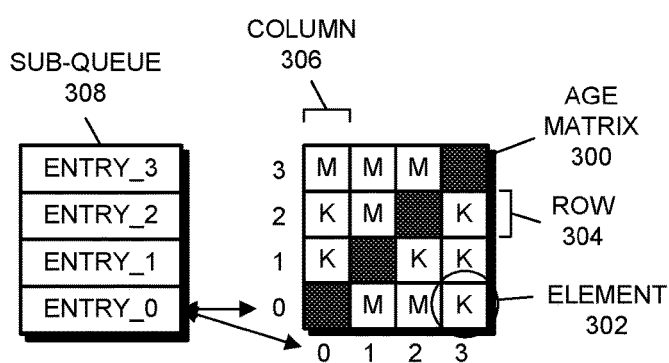
FIG. 3 presents a block diagram illustrating an age matrix in accordance with some embodiments.

Controller 210 includes age matrices 212-216. Each of age matrices 212-216 is a functional block that includes memory circuitry (e.g., flip flops, latches, SRAM memory circuitry, etc.) for storing an age matrix for a corresponding one of the sub-queues. Generally, each age matrix includes an arrangement of data (e.g., an array or a portion thereof, a table, a list, etc.) useable for identifying relative ages of items stored in entries in an associated sub-queue. FIG. 3 presents a block diagram illustrating an age matrix 300 in accordance with some embodiments. As can be seen in FIG. 3, age matrix 300 includes a number of elements 302 arranged in rows 304 and columns 306. The elements 302 in each row 304 and column 306 are associated with a different entry in a corresponding sub-queue and are used for storing age information for the associated entry (i.e., for an item stored in the associated entry). For example, the bottommost row 304 and leftmost column 306 in age matrix 300 are associated with entry_0 in sub-queue 308. The bottommost row 304 and leftmost column 306 in age matrix 300 therefore store age information relating to an item stored in entry_0. Note that in age matrix 300 the diagonal row, which would hold values that represent the relative ages of items stored in the same entries in an associated sub-queue is shown in black—as such values are of little use and are not kept in some embodiments (and are only presented in FIG. 3 for clarity).

In some embodiments, the age information is stored in each element 302 using a specified number of bits. For example, in some embodiments, age information is stored in each element 302 in age matrix 300 using a single bit. In these embodiments, what the values of the bit in each element 302 indicate/represent in terms of the relative ages of items stored in entries in the associated sub-queue is determined and set in advance. For example, in some embodiments, 0s represent younger items and 1s represent older items. As another example, in some embodiments, 1s represent younger items and 0s represent older items. For the example in FIG. 3, Ms and Ks are used as placeholders for illustrative purposes, but have no specific meaning. The values of bits and interpretation of relative age information in age matrix 300 is described in more detail below.

Figure 4:
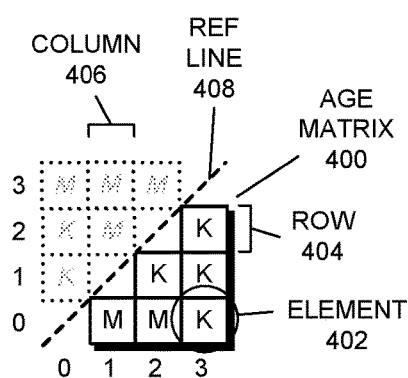
FIG. 4 presents a block diagram illustrating a reduced form of an age matrix in accordance with some embodiments.

Age matrix 300 as shown in FIG. 3 is an example of a particular arrangement of data for an age matrix, but age matrices 212-216 may store data in one or more different arrangements, including arrangements that are not easily readable (e.g., a list, a table, etc.) but that otherwise represent what is shown in FIG. 3. For example, FIG. 4 presents a block diagram illustrating a reduced form of age matrix 400 in accordance with some embodiments. As with age matrix 300, age matrix 400 includes elements 402 arranged in rows 404 and columns 406. Unlike age matrix 300, however, age matrix 400 lacks elements 402 in rows 404 and columns 406 above reflection (REF) line 408. This is because the values that would be stored in such elements 402 of age matrix 400 can be determined by reflecting and swapping the values in the elements 402 that are present in matrix 400 (for this example, M is the swap of K and vise versa). This is shown in FIG. 4 using dotted lines and italicized letters (which are similar in value to those in the corresponding elements 302 of age matrix 300). In other words, given the information in elements 402 on one side of reflecting line 408, the values that would be stored in elements 402 on the other side of the reflecting line can be computed. For this reason, in some embodiments, the reduced age matrix 400 is used instead of age matrix 300.

Note that, although queue 200 is presented with a specific number of entries and an arrangement of sub-queues, in some embodiments, queue 200 includes a different number of entries and/or arrangement of sub-queues. For example, in some embodiments, queue 200 includes a different number of entries in some or all of highest sub-queue 204, intermediate sub-queue 206, and lowest sub-queue 208. In other words, in these embodiments some or all of the sub-queues have a different number of entries than one or more others of the sub-queues. As another example, in some embodiments, queue 200 includes four or more sub-queues. Generally, in the described embodiments, queue 200 includes sufficient sub-queues and entries therein (and other circuitry) to perform the operations described herein.

Using an Age Matrix for Tracking the Relative Ages of Items in a Sub-Queue

Figure 5:
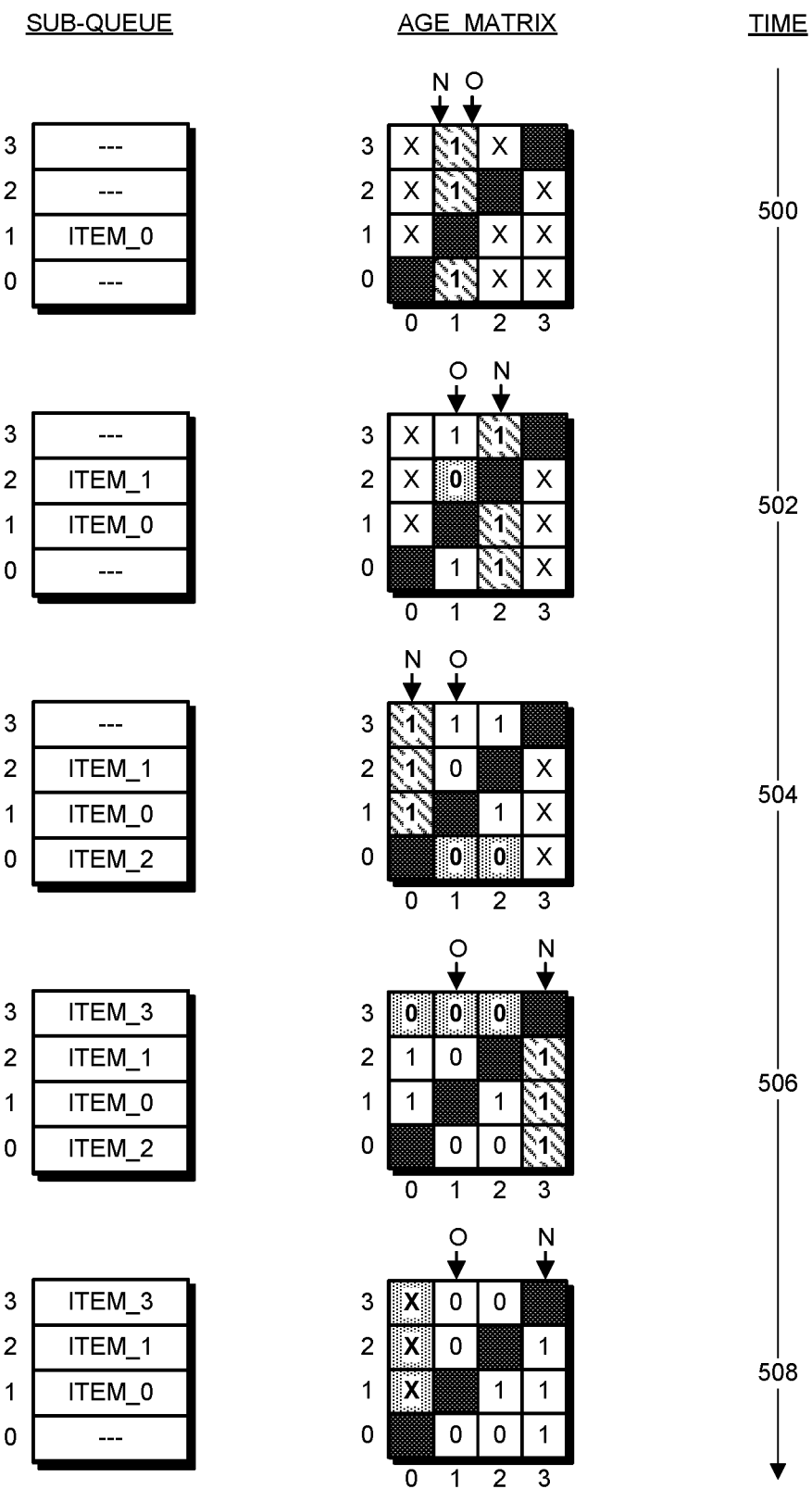
FIG. 5 presents a block diagram illustrating a process for using an age matrix for keeping track of the relative ages of items in a sub-queue in accordance with some embodiments.

In the described embodiments, age matrices are used for keeping track of the relative ages of items stored in entries in sub-queues in an electronic device. FIG. 5 presents a block diagram illustrating a process for using an age matrix for keeping track of the relative ages of items in a sub-queue in accordance with some embodiments. Note that the operations shown in FIG. 5 are presented as a general example of operations performed by some embodiments. The operations performed by other embodiments include different operations, operations that are performed in a different order, and/or operations that are performed by different functional blocks. In addition, in some embodiments, the sub-queue has a different number of entries and the age matrix has a different number and/or arrangement of elements.

In FIG. 5, states of a sub-queue are shown on the left side, corresponding states of an age matrix are shown in the center, and an arrow indicating a progression of time is shown on the right side. Generally, in FIG. 5, at five separate times, i.e., times 500-508, four items (i.e., items_0-item_3) are stored in the sub-queue and one item is removed (i.e., item_2), with the illustrated changes being made in the age matrix. In addition, in FIG. 5, elements of the age matrix that are written due to an item having been stored in an entry of the sub-queue are shown using a diagonal hatched background, elements that are updated due to an item having been stored in an entry of the sub-queue or removed from an entry of the sub-queue are shown with stippled/dotted background, and unchanged elements are shown with a white background. (Recall that the elements on the central diagonal in the age matrix are shown in black as those elements are not used in some embodiments.) Also, for the sake of illustration, a "new" (N) and "old" (O) pointer are shown in FIG. 5 to illustrate the column of the age matrix that identifies the entries that store the newest and oldest items in the sub-queue, although the new and old pointers may not exist/be used in some embodiments.

For the example in FIG. 5, times 500-508 are illustrated. Individually, these times can be any absolute or relative time. With regard to the overall flow of time, times 500-508 and their placement in FIG. 5 are not intended to indicate any relationship between the times and are not drawn to a particular scale. Times 500-508 could therefore occur over several milliseconds, seconds, etc. with different numbers of milliseconds, seconds, etc. occurring between each of times 500-508.

In some embodiments, when no item is presently stored in an entry in an associated sub-queue, a validity flag/register associated with a column in the age matrix (which may be or include validity information in metadata in the entry itself) (not shown) is set to indicate that the respective column in the age matrix is invalid and therefore should not be used in age-determining operations. This is shown in FIG. 5 using Xs in the elements in such columns, although in some embodiments, the elements in such columns may store other values, including 0s or 1s—and the validity flag/register value controls whether or not a controller (e.g., controller 210) uses the values in the elements. For the example in FIG. 5, although not shown for clarity, it is assumed that the sub-queue is initially empty and thus age matrix has the validity flag/register value set to indicate that all of the columns are invalid—and thus the elements in all of the columns would initially be shown with Xs (as can be seen, three of the columns remain invalid at time 500).

For the operations in FIG. 5, a particular pattern of 0s and 1s in columns of the age matrix is used for determining an entry in a sub-queue in which an oldest element among the elements in the sub-queue is stored. More specifically, the entry in the sub-queue that includes the oldest item is determined based on the column that includes no 1s (and possibly all 0s). Generally, for this pattern, the column in the age matrix that is associated with the entry in the sub-queue in which the oldest item is stored includes no 1s (and thus only 0s). Although this pattern is used for the example in FIG. 5, in some embodiments, a different pattern is used. For example, the properties associated with 0s and 1s may be reversed, so that the column with the most 1s is used for determining an entry in a sub-queue in which an oldest element is stored. As another example, values in rows of elements in the age matrix may be used instead of columns—with the updating of the age matrix as described below adjusted accordingly. In addition, although an age matrix with a particular arrangement of rows and columns is used for the example in FIG. 5, in some embodiments, an age matrix with a different arrangement of rows and/or columns is used. For example, the reduced age matrix shown in FIG. 4 or some representation thereof can be used in some embodiments. Generally, in the described embodiments, any arrangement of values can be stored in an age matrix having a respective set of rows and columns (or the equivalent) and used to determine the relative ages of entries in the sub-queue.

Turning now to FIG. 5, at time 500, the controller receives item_0, determines that item_0 is to be stored in entry 1 in the sub-queue (as incoming items are permitted to be stored in any available entry in the sub-queue), and stores item_0 into entry 1 in the sub-queue. The controller also updates the age matrix to indicate that a newest item in the sub-queue is stored in entry 1 of the sub-queue. For the updating, the controller sets the elements in the column associated with entry 1 equal to 1. This can be seen in the age matrix because the elements of column 1 have the diagonal hatched background—and are set to 1. Because the other columns in the age matrix are invalid at time 500 (and therefore contain the X invalidity value), no changes are made to the rows. In some embodiments, however, the elements in row 1 would be set to 0 despite the columns being invalid.

Because only the column of the age matrix associated with entry 1 has valid values at time 500, the new and old pointers both indicate the column associated with entry 1. If the controller used the age matrix to determine the entry in the sub-queue that stored the oldest element at time 500, the controller would identify entry 1 of the sub-queue based on the values in elements of the age matrix. For example, in some embodiments, while disregarding values in elements in invalid rows (i.e., rows for which the associated entry in the sub-queue do not presently store an item), the controller finds the valid column that includes no 1s. In other words, while masking rows using corresponding validity information (e.g., a valid bit in metadata for the associated entry in the sub-queue), the controller determines the valid column in the age matrix that has no 1s. Because the three rows of 1s in column 1 are disregarded—and column 1 is the only valid column—the controller identifies column 1 as including no 1s. The controller also determines that entry 1 of the sub-queue, which is associated with column 1, stores the oldest item.

At time 502, the controller receives item_1, determines that item_1 is to be stored in entry 2 in the sub-queue, and stores item_1 into entry 2 in the sub-queue. The controller also updates the age matrix to indicate that a newest item in the sub-queue is stored in entry 2 of the sub-queue. For the updating, the controller sets the elements in the column associated with entry 2 equal to 1. This can be seen in the age matrix because the elements of column 2 have the diagonal hatched background—and are set to 1. The controller also sets all the valid elements in the row associated with entry 2 equal to 0. This can be seen in the age matrix because the elements of row 2 have the stippled/dotted background—and are set to 0. Note that only the element in column 1 of row 2 is set to 0—because the other columns in the age matrix are invalid at time 502, no changes are made to these elements in row 2.

At time 502, two columns of the age matrix include age information. Generally, for the embodiment shown in FIG. 5, entries storing newer items include more 1s in the column (the columns are set this way, as described above). Because the column associated with entry 2 has more 1s at time 502 (i.e., three 1s), therefore, the new pointer indicates the column associated with entry 2. On the other hand, the column associated with entry 1, due to the setting of the 0s in row 2, has less 1s at time 502 (i.e., two 1s), and thus the old pointer remains indicating the column associated with entry 1—the entry storing the oldest item in the sub-queue. If the controller used the age matrix to determine the entry in the sub-queue that stored the oldest element at time 502, the controller would identify entry 1 of the sub-queue based on the relative number of 1s stored in columns of the age matrix. For example, in some embodiments, while disregarding values in elements in invalid rows (i.e., rows for which the associated entry in the sub-queue do not presently store an item), the controller finds the valid column that includes no 1s. In other words, while masking rows using corresponding validity information, the controller determines the valid column in the age matrix that has no 1s. Because rows 1 and 2 are both valid (while rows 0 and 3 are invalid), the controller considers only the values in elements in the center four-element square of the age matrix. The controller therefore identifies column 1 as being the column that includes no 1s. The controller also determines that entry 1 of the sub-queue, which is associated with column 1, stores the oldest item. For example, in some embodiments, the controller includes an arrangement of logic gates (e.g., NAND, NOR, etc. logic gates) that the controller uses for determining which column has the most 1s (or 0s).

At time 504, the controller receives item_2, determines that item_2 is to be stored in entry_0 in the sub-queue, and stores item_2 into entry_0 in the sub-queue. The controller also updates the age matrix to indicate that a newest item in the sub-queue is stored in entry_0 of the sub-queue. For the updating, the controller sets the elements in the column associated with entry_0 equal to 1. This can be seen in the age matrix because the elements of column 0 have the diagonal hatched background—and are set to 1. The controller also sets all the valid elements in the row associated with entry_0 equal to 0. This can be seen in the age matrix because the elements of row 0 have the stippled/dotted background—and are set to 0. The elements in columns 1 and 2 of row 0 are set to 0—because column 3 is invalid at time 504, no changes are made to this element in row 0.

At time 504, three columns of the age matrix include age information. Because the column associated with entry_0 has the most 1s at time 504 (i.e., three 1s), the new pointer indicates the column associated with entry_0. On the other hand, the columns associated with each of entries 1 and 2, due to the setting of the 0s in row 0, have less 1s at time 504. The column with the most 0s is the column associated with entry 1, and thus the old pointer remains indicating the column associated with entry 1—which remains the entry storing the oldest item in the sub-queue. If the controller used the age matrix to determine the entry in the sub-queue that stored the oldest element at time 504, the controller would identify entry 1 of the sub-queue based on the relative number of 1s stored in columns of the age matrix. For example, in some embodiments, while disregarding values in elements in invalid rows (i.e., rows for which the associated entry in the sub-queue do not presently store an item), the controller finds the valid column that includes no 1s. In other words, while masking rows using corresponding validity information, the controller determines the valid column in the age matrix that has no 1s. Because rows 0, 1, and 2 are all valid (while row 3 is invalid), the controller considers only the values in elements in the lower left nine-element block within the age matrix. The controller therefore identifies column 1 as being the column that includes no 1s. The controller also determines that entry 1 of the sub-queue, which is associated with column 1, stores the oldest item.

At time 506, the controller receives item_3, determines that item_3 is to be stored in entry 3 in the sub-queue, and stores item_3 into entry 3 in the sub-queue. The controller also updates the age matrix to indicate that a newest item in the sub-queue is stored in entry 3 of the sub-queue. For the updating, the controller sets the elements in the column associated with entry 3 equal to 1. This can be seen in the age matrix because the elements of column 3 have the diagonal hatched background—and are set to 1. The controller also sets all the valid elements in the row associated with entry 3 equal to 0. This can be seen in the age matrix because the elements of row 0 have the stippled/dotted background—and are set to 0.

At time 506, all four columns of the age matrix include age information. Because the column associated with entry 3 has the most 1s at time 506 (i.e., three 1s), the new pointer indicates the column associated with entry 3. On the other hand, the columns associated with each of entries 0, 1, and 2, due to the setting of the 0s in row 3, have less 1s at time 504. The column with the most 0s is the column associated with entry 1, and thus the old pointer remains indicating the column associated with entry 1—which remains the entry storing the oldest item in the sub-queue. If the controller used the age matrix to determine the entry in the sub-queue that stored the oldest element at time 506, the controller would identify entry 1 of the sub-queue based on the relative number of 1s stored in columns of the age matrix. For example, in some embodiments, while disregarding values in elements in invalid rows (i.e., rows for which the associated entry in the sub-queue do not presently store an item), the controller finds the valid column that includes no 1s. Because all of the rows of the age matrix are valid, the controller considers the values in all of the elements in the age matrix. The controller therefore identifies column 1 as being the column that includes no 1s. The controller also determines that entry 1 of the sub-queue, which is associated with column 1, stores the oldest item At time 508, the controller removes item_2 from entry_0 in the sub-queue. This removal is out of order with respect to the ages of items in the sub-queue. In some embodiments, this is permitted when newer items are "ready" to be removed before older items in the sub-queue. For example, when the items are processing tasks in processing subsystem 102, item_2 may require a different and available first processing resource (e.g., execution unit, interrupt processor, etc.) than item_0 and item_1, which are waiting for a busy second processing resource. The controller also updates the age matrix to indicate that item_2 was removed from the sub-queue. For the updating, the controller sets the validity flag/register value for column associated with entry_0 to indicate that the column is invalid. As described above, this can be seen in the age matrix because the elements of column 0 have the stippled/dotted background—and are set to X.

At time 508, three columns of the age matrix include valid age information. Because the column associated with entry 3 has the most 1s at time 506 (i.e., three 1s), the new pointer indicates the column associated with entry 3. On the other hand, the columns associated with each of entries 1 and 2 have less 1s at time 508. The column with the most 0s is the column associated with entry 1, and thus the old pointer remains indicating the column associated with entry 1—which remains the entry storing the oldest item in the sub-queue. If the controller used the age matrix to determine the entry in the sub-queue that stored the oldest element at time 508, the controller would identify entry 1 of the sub-queue based on the relative number of 1s stored in columns of the age matrix. For example, in some embodiments, while disregarding values in elements in invalid rows (i.e., rows for which the associated entry in the sub-queue do not presently store an item), the controller finds the valid column that includes no 1s. In other words, while masking rows using corresponding validity information, the controller determines the valid column in the age matrix that has no 1s. Because rows 1, 2, and 3 are all valid (while row 0 is invalid), the controller considers only the values in elements in the upper right nine-element block within the age matrix. The controller therefore identifies column 1 as being the column that includes no 1s. The controller also determines that entry 1 of the sub-queue, which is associated with column 1, stores the oldest item If the operations shown in FIG. 5 were to continue at an additional time following time 508 with the removal of the item in entry 1 of the sub-queue (not shown), the controller would set the validity flag/register value for the column associated with entry 1 to indicate that the column is invalid. At this point, using the age matrix to determine the oldest item present in the sub-queue would return column 2, which would have no 1s in the upper right four-square box of elements in the age matrix that is used for the determining. On the other hand, if a new item were to be stored in the vacant entry_0, the controller would again write 1s in the corresponding column and 0s in the corresponding row in the age matrix—an operation similar to what is described above.

Shifting Items Between Sub-Queues

Figure 6:
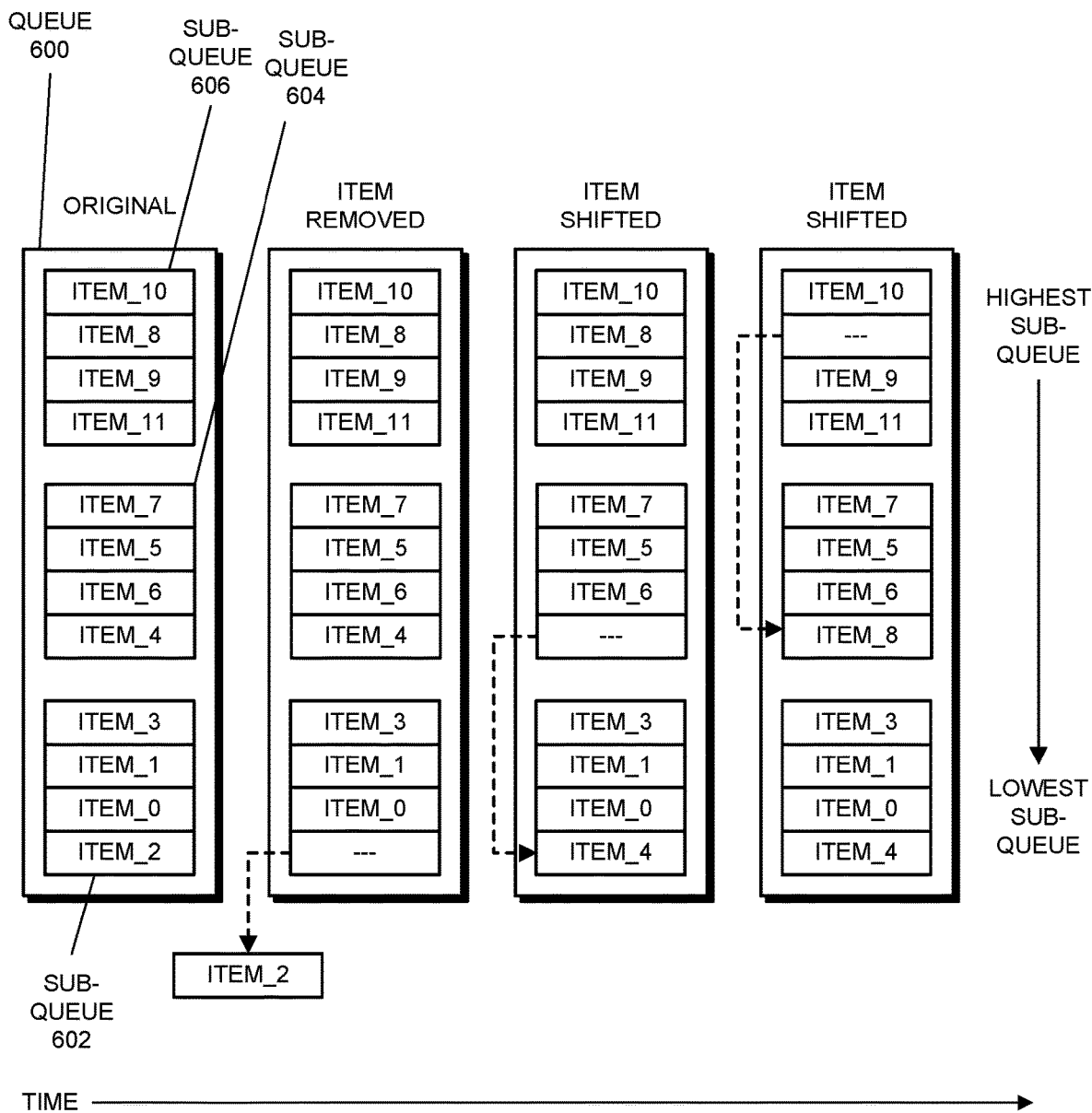
FIG. 6 presents a block diagram illustrating the removal of an item from a lowest sub-queue in a hierarchy of sub-queues and the subsequent shifting of items from higher sub-queues in the hierarchy to fill the vacancy in the lowest sub-queue in accordance with some embodiments.

In the described embodiments, as items are removed from a lowest sub-queue in a hierarchy of two or more sub-queues, a vacancy is created in the lowest sub-queue. A controller shifts items downward from higher sub-queues in the hierarchy—when such items exist—to fill the vacancy in the lowest sub-queue. FIG. 6 presents a block diagram illustrating the removal of an item from a lowest sub-queue in a hierarchy of sub-queues and the subsequent shifting of items from the higher sub-queues in the hierarchy to fill the vacancy in the lowest sub-queue in accordance with some embodiments. Note that the operations shown in FIG. 6 are presented as a general example of operations performed by some embodiments. The operations performed by other embodiments include different operations, operations that are performed in a different order, and/or operations that are performed by different functional blocks. In addition, in some embodiments, a different number of sub-queues are used and/or some or all of the sub-queues have different numbers of entries.

For the example in FIG. 6, queue 600 includes three sub-queues 602-606, each of which has capacity for storing four items. In the original state, which shown on the left side of FIG. 6, a controller has stored items in all the entries in all three of sub-queues 602-606. Although age matrices are not shown in FIG. 6 for clarity, a separate age matrix is assumed to exist for each of sub-queues 602-606. Each of the age matrices is further assumed to have been updated (e.g., as described above for FIG. 5), and thus to hold current relative age information for the associated sub-queue.

As described above, for the operations in FIG. 6, sub-queues 602-606 originally each hold four items. The controller then removes item_2 from sub-queue 602 (i.e., the lowest sub-queue in the hierarchy of sub-queues). For this operation, the controller determines that item_2 is ready for removal, reads item_2 from sub-queue 602 (and may provide item_2 to another functional block), and invalidates and/or clears the entry in sub-queue 602. The controller also updates the age matrix for sub-queue 602 to reflect the change in the items stored in sub-queue 602. Recall that, in some embodiments, items are permitted to be removed in any order from the lowest sub-queue in the hierarchy of sub-queues, based on which items are ready for removal. It may be true, therefore, that one or more items younger than item_2 (e.g., item_0, etc.) remain stored in the lowest sub-queue—which will be reflected, after the update, in the relative age information in the age matrix associated with sub-queue 602.

After removing item_2 from sub-queue 602, the controller shifts an item from the next higher sub-queue, i.e., sub-queue 604, to fill the vacancy in sub-queue 602. For this operation, the controller determines an oldest item in sub-queue 604 by determining a particular column (or row) in the age matrix associated with sub-queue 604 that best meets a specified criteria for values in the column (e.g., includes the most 0s). The controller then identifies, based on the particular column in the age matrix, the entry in sub-queue 604 in which the oldest item is stored. For the example in FIG. 6, it is assumed that the oldest item in sub-queue 604 is item_4, and thus the controller identifies the entry in which item_4 is stored using based on the values in elements in a corresponding column in the age matrix for sub-queue 604. The controller then reads item_4 from sub-queue 604, invalidates and/or clears the entry in sub-queue 604, and stores item_4 in the vacant entry in sub-queue 602. The controller also updates the respective age matrices for both sub-queues 602 and 604 to reflect the change in the items stored in sub-queues 602 and 604. Alternatively, the controller may not update the age matrices for each of the sub-queues until all the movements of data affecting a given sub-queue have occurred—and thus may leave the age matrix associated with sub-queue 604 unchanged until the final shift occurs.

After shifting item_4 from sub-queue 604 to sub-queue 602, the controller shifts an item from the next higher sub-queue, i.e., sub-queue 606, to fill the vacancy in sub-queue 604. For this operation, the controller determines an oldest item in sub-queue 606 using the associated age matrix (similarly to what was described above for sub-queue 602). For the example in FIG. 6, it is assumed that the oldest item in sub-queue 606 is item_8, and thus the controller identifies the entry in which item_8 is stored using based on the values in elements in a corresponding column in the age matrix for sub-queue 606. The controller then reads item_8 from sub-queue 606, invalidates and/or clears the entry in sub-queue 606, and stores item_8 in the vacant entry in sub-queue 604. The controller also updates the respective age matrices for both sub-queues 604 and 606 to reflect the change in the items stored in sub-queues 604 and 606.

At the end of the operations shown in FIG. 6, sub-queue 606 has an entry that is available for storing an item, i.e., a vacancy. Although not shown in FIG. 6, in a subsequent operation, a new item (e.g., received from another functional block) can be stored in the available entry in sub-queue 606. As with other operations that change the items stored in entries in sub-queues, after storing the new item in sub-queue 606, the controller would update the age matrix for sub-queue 606 to indicate the relative ages of items stored therein.

Figure 7:
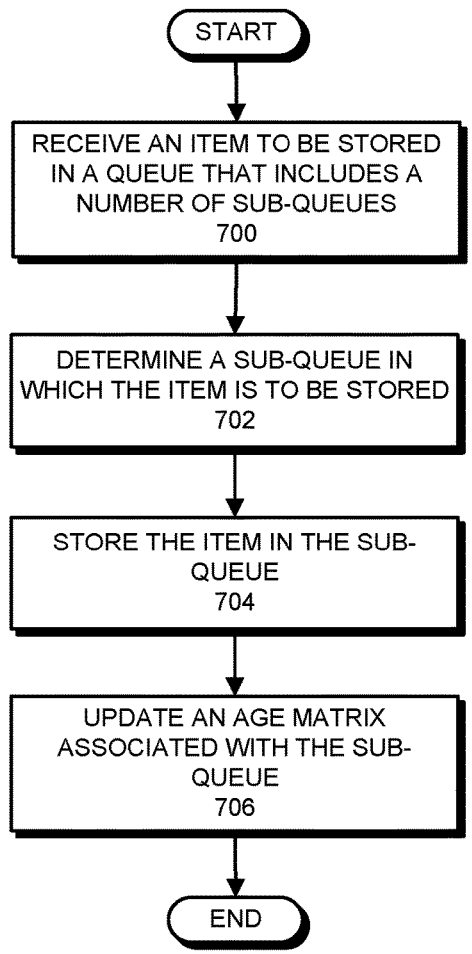
FIG. 7 presents a flowchart illustrating a process for using age matrices for keeping track of the relative ages of items stored in sub-queues in accordance with some embodiments.

Processes for Using Age Matrices for Keeping Track of the Relative Ages of Items Stored in Sub-Queues in a Hierarchy of Sub-Queues The described embodiments use age matrices for keeping track of the relative ages of items stored in sub-queues in a hierarchy of sub-queues. FIG. 7 presents a flowchart illustrating a process storing an item in a sub-queue and updating an age matrix for the sub-queue in accordance with some embodiments. For the process in FIG. 7, it is assumed that a controller (e.g., controller 210) in a networking subsystem (e.g., networking subsystem 108) stores an item into an entry in a sub-queue (e.g., intermediate sub-queue 206, lowest sub-queue 208, etc.) from among a hierarchy of sub-queues in a queue (e.g., queue 200) in the networking subsystem. It is also assumed that the sub-queue is associated with an age matrix (e.g., age matrix 300) that is used for keeping track of the relative ages of items stored in entries in the sub-queue. Note that the operations shown in FIG. 7 are presented as a general example of operations performed by some embodiments. The operations performed by other embodiments include different operations, operations that are performed in a different order, and/or operations that are performed by different functional blocks.

The process in FIG. 7 starts when the controller receives an item to be stored in a queue that includes a number of sub-queues (step 700). For this operation, the networking subsystem (or another functional block or entity) provides, to the controller, an item that identifies a network transaction such as a packet to be sent or forwarded to a downstream electronic device via a network, a control or configuration value to be transmitted to a downstream electronic device via a network, a message to be subsequently processed in the networking subsystem, etc. The item can include a number of bits or bytes organized into specified fields or portions that identify, characterize, and/or represent the network transaction.

The controller then determines a sub-queue in which the item is to be stored (step 702). For this operation, the controller determines a lowest sub-queue in the hierarchy of sub-queues in which a vacant entry is available for storing the item. For example, the controller may maintain a pointer to the lowest queue in the hierarchy in which one or more entries are available, may keep a count of the items presently stored in all of the sub-queues, may query some or all of the sub-queues or entries therein regarding availability, etc., and may determine the lowest sub-queue based thereon. In this way, the controller stores items in the lowest sub-queue until the lowest sub-queue becomes full, and then stores items in successively next higher sub-queues in the hierarchy as each next higher sub-queue becomes full. As part of this operation, the controller also determines the particular entry in the sub-queue into which the item is to be stored. In some embodiments, items are permitted to be stored in entries in sub-queues in any order (i.e., are not restricted to being stored in the entries in an order such as first-in-first-out) and may be removed out of order, so the particular entry is determined by the controller each time that an item is stored to a sub-queue.

The controller next stores the item in the sub-queue (step 704). For this operation, the controller writes, to the memory circuitry in the determined entry in the sub-queue, bits or bytes of the item or a representation thereof. Continuing the example above, this operation involves writing information about the network transaction to the entry in the sub-queue.

The controller then updates an age matrix associated with the sub-queue (step 706). For this operation, the controller updates the age matrix to indicate that the entry in the sub-queue stores a youngest item from among the entries in the sub-queue. For example, assuming an embodiment in which the age matrix is updated as shown in FIG. 5, the controller sets elements in a column in the age matrix associated with the entry in the sub-queue to 1 and sets elements in a row in the age matrix associated with the entry in the given sub-queue to 0. After this operation, the column in the age matrix associated with the entry in the sub-queue stores all 1s and therefore indicates that the entry stores the youngest item in the sub-queue.

Figure 8:
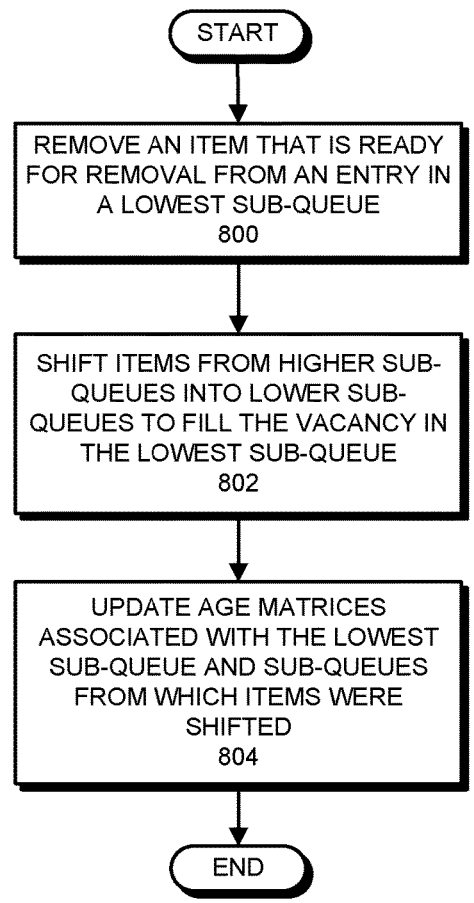
FIG. 8 presents a flowchart illustrating a process for shifting items in sub-queues in a hierarchy of sub-queues to fill a vacancy in a lowest sub-queue and updating age matrices for the sub-queues in accordance with some embodiments.

FIG. 8 presents a flowchart illustrating a process for shifting items in sub-queues in a hierarchy of sub-queues to fill a vacancy in a lowest sub-queue and updating age matrices for the sub-queues in accordance with some embodiments. For the process in FIG. 8, it is assumed that a controller (e.g., controller 210) in a networking subsystem (e.g., networking subsystem 108) stores removes an item from an entry in a lowest sub-queue (e.g., lowest sub-queue 208, etc.) from among a hierarchy of sub-queues in a queue (e.g., queue 200) in the networking subsystem. It is further assumed that the sub-queues in the hierarchy of sub-queues are each associated with a separate age matrix (e.g., age matrix 300) that is used for keeping track of the relative ages of items stored in entries in that sub-queue. Note that the operations shown in FIG. 8 are presented as a general example of operations performed by some embodiments. The operations performed by other embodiments include different operations, operations that are performed in a different order, and/or operations that are performed by different functional blocks.

The process in FIG. 8 starts when the controller removes an item that is ready for removal from an entry in the lowest sub-queue (step 800). For this operation, the controller determines that an item is ready for removal from the lowest sub-queue based on the item itself or metadata for the entry in which the items is stored, operating states of functional blocks in the electronic device, busyness or idleness of downstream network devices or communication links in the network, etc. For example, the controller can determine that a communication link to be used for communicating a packet (i.e., the item) to a downstream network device is or has become available. The controller then removes the item from the entry in the lowest sub-queue and handles the item (e.g., forwards the packet to a downstream network device, etc.). Note that, as described above, the item that is ready for removal may be younger than other items in the sub-queue, but may still be removed from the sub-queue out of order with respect to older items in the sub-queue. In other words, the controller can remove the item from the lowest sub-queue regardless of an age of the item, so that an item that is younger than an oldest item in the lowest sub-queue is removed before the oldest item is removed from the lowest sub-queue.

After removing the item from the lowest sub-queue, the controller shifts items from higher sub-queues into lower sub-queues to fill the vacancy in the entry in the lowest sub-queue (step 802). For this operation, the controller generally shifts items downward in the hierarchy of sub-queues as described for FIG. 6. In other words, starting from the lowest sub-queue and proceeding through sub-queues in the hierarchy in order, for each sub-queue, the controller performs the following operations. When a next higher sub-queue in the hierarchy exists (i.e., the controller has not reached the top sub-queue in the hierarchy) and the next higher sub-queue stores at least one item (i.e., is not empty and thus has items to shift), the controller determines, using the age matrix associated with the next higher sub-queue, an entry in which an oldest item in the next higher sub-queue is stored. In some embodiments, for this operation, the controller determines a column (or row) in the age matrix associated with the next higher sub-queue that best meets a specified criteria for the values in the column (e.g., as described for FIG. 5) and then uses the column to identify the entry in the next higher sub-queue in which the oldest item is stored. The controller next moves the oldest item from the entry in the next higher sub-queue into that sub-queue.

The controller then updates age matrices associated with the lowest sub-queue and sub-queues in the hierarchy from which items were shifted (step 804). For this operation, the controller updates the age matrix for each sub-queue that experienced a change in the items stored therein, either by having a new item shifted in from a higher sub-queue or having an item shifted out to a lower sub-queue and not replaced (as with a highest sub-queue or an intermediate sub-queue with only empty higher sub-queues). For example, assuming an embodiment in which age matrices are updated as shown in FIG. 5, the controller, when updating the age matrix for each sub-queue to which an item was shifted/stored, sets, to 1, elements in a column in the age matrix associated with the shifted/newly added entry in that sub-queue and sets, to 0, elements in a row in the age matrix associated with the shifted/newly added entry in that sub-queue. As another example, the controller, when updating the age matrix for a sub-queue from which an item was shifted out (vacating an entry) and another item was not shifted in, sets the invalid flag/register for a column in the age matrix that is associated with the vacated entry in that sub-queue.

Removing Multiple Items from a Sub-Queue in a Removal Operation

In the examples above in this description, single items are removed from the lowest sub-queue and then single items shifted within the hierarchy of sub-queues to fill the vacancy in the lowest sub-queue. Removing only single items is, however, not a requirement. In some embodiments, two or more items that are ready for removal can be removed from the lowest sub-queue in a single removal operation (i.e., can be removed together/as a group), including multiple items for which there are one or more older items in the lowest sub-queue. In other words, in these embodiments, two or more items can be removed at a time and out of order from the lowest sub-queue when the items are ready for removal. As with removing a single item from the lowest sub-queue, a corresponding number of items from the higher sub-queues in the hierarchy (assuming such items exist) are shifted to fill the vacancies in the lowest sub-queue.

In some embodiments, at least one electronic device (e.g., electronic device 100) uses code and/or data stored on a non-transitory computer-readable storage medium to perform some or all of the operations herein described. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, neural network processors, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (program code, firmware, etc.), perform the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
   a queue including two or more sub-queues, each of the two or more sub-queues including a separate subset of a set of entries for the queue, the sub-queues being arranged in a logical hierarchy from a lowest sub-queue to a highest sub-queue;
   a memory associated with each sub-queue of the two or more sub-queues, each of the memories storing an age matrix for the associated sub-queue, each age matrix including only elements on a first side of a reflecting line for which values can be used to determine values for elements on a second side of the reflecting line, the values in the elements of each age matrix identifying relative ages of items stored in entries in the associated sub-queue; and
   a controller configured to:
      store items in the queue by storing items in the lowest sub-queue until the lowest sub-queue becomes full, and then storing items in successively next higher sub-queues in the hierarchy as each next higher sub-queue becomes full;
      remove an item from the queue by removing an item that is ready for removal from an entry in the lowest sub-queue; and
      shift items stored in sub-queues in the hierarchy to fill the entry in the lowest sub-queue by, starting from the lowest sub-queue and proceeding through sub-queues in the hierarchy, for each sub-queue:
         when a next higher sub-queue in the hierarchy exists and stores at least one item, determining, using the age matrix associated with the next higher sub-queue, an entry in which an oldest item in the next higher sub-queue is stored; and
         moving the oldest item from the entry in the next higher sub-queue into that sub-queue.

2. The electronic device of claim 1, wherein:
   the elements in each age matrix are arranged in rows and columns;
   the elements in each row and column are associated with a different entry in a corresponding sub-queue; and
   each element is configured to store a value that indicates whether the entry in the corresponding sub-queue associated with the row is older than the entry in the corresponding sub-queue associated with the column.

3. The electronic device of claim 2, wherein, when determining, using an age matrix associated with a given sub-queue, an entry in which an oldest item in the given sub-queue is stored, the controller is configured to:
   determine values for elements in rows and columns of the age matrix on the second side of the reflecting line of the age matrix using the values of elements in rows and columns on the first side of the reflecting line;
   determine a particular column in the age matrix associated with the given sub-queue that best meets a specified criteria for the values in the column; and
   identify based on the particular column in the age matrix, the entry in the given sub-queue in which the oldest item is stored.

4. The electronic device of claim 2, wherein, when storing items in a given sub-queue, the controller is configured to:
   store an item in an available entry in the given sub-queue; and
   update the age matrix associated with the given sub-queue, the updating including:
      setting, to a first value, elements in a column in the age matrix on the first side of the reflecting line that are associated with the entry in the given sub-queue; and
      setting, to a second value, elements in a row in the age matrix on the first side of the reflecting line that are associated with the entry in the given sub-queue.

5. The electronic device of claim 4, wherein, when a particular entry in a given sub-queue presently stores no item, the controller is configured to:
   set a valid indicator for the elements in a column in the age matrix associated with the particular entry to indicate that the elements in that column are invalid and thus are not to be used.

6. The electronic device of claim 4, wherein, when storing items in a given sub-queue, the controller is configured to:
   store an item in any available entry in the given sub-queue regardless of the ages of items stored in other entries in the given sub-queue.

7. The electronic device of claim 2, wherein some or all of the sub-queues in the hierarchy have different numbers of entries than other sub-queues in the hierarchy.

8. The electronic device of claim 2, wherein, when determining, using an age matrix associated with a given sub-queue, an entry in which an oldest item in the given sub-queue is stored, the controller is configured to:
   determine values for elements in rows and columns of the age matrix on the second side of the reflecting line of the age matrix using the values of elements in rows and columns on the first side of the reflecting line;
   determine a particular row in the age matrix associated with the given sub-queue that best meets a specified criteria for the values in the column; and
   identify, based on the particular row in the age matrix, the entry in the given sub-queue in which the oldest item is stored.

9. The electronic device of claim 2, wherein, when storing items in a given sub-queue, the controller is configured to:
   store an item in an available entry in the given sub-queue; and
   update the age matrix associated with the given sub-queue, the updating including:
      setting, to a first value, elements in a row in the age matrix on the first side of the reflecting line that are associated with the entry in the given sub-queue; and
      setting, to a second value, elements in a column in the age matrix on the first side of the reflecting line that are associated with the entry in the given sub-queue.

10. The electronic device of claim 9, wherein, when a particular entry in a given sub-queue presently stores no item, the controller is configured to:
    set a valid indicator for the elements in a row in the age matrix associated with the particular entry to indicate that the elements in that column are invalid and thus are not to be used.

11. The electronic device of claim 1, wherein, when removing the item that is ready for removal from the entry in the lowest sub-queue, the controller is configured to:
    remove the item from the lowest sub-queue regardless of an age of the item, so that the item that is younger than an oldest item in the lowest sub-queue may be removed out of order with respect to the oldest item.

12. The electronic device of claim 1, wherein the controller is further configured to:
   remove one or more other items from the queue when removing the item from the queue so that at least two items are removed from the queue in a same removal operation, the removing comprising removing one or more other items that are ready for removal from one or more other entries in the lowest sub-queue; and
   shift, along with shifting the items for filling the entry in the lowest sub-queue, other items in the sub-queues to fill the one or more other entries in the lowest sub-queue.

13. The electronic device of claim 1, wherein items are only removed from the lowest sub-queue of the queue.

14. A method for handling items in an electronic device, the electronic device having a queue that includes two or more sub-queues, each of the two or more sub-queues including a separate subset of a set of entries for the queue, and the sub-queues being arranged in a logical hierarchy from a lowest sub-queue to a highest sub-queue; memory circuitry associated with each sub-queue of the two or more sub-queues, each memory circuitry storing an age matrix for the associated sub-queue, each age matrix including only elements on a first side of a reflecting line for which values can be used to determine values for elements on a second side of the reflecting line, the values in the elements of each age matrix identifying relative ages of items stored in entries in the associated sub-queue; and a controller, the method comprising:
   storing, by the controller, items in the queue by storing items in the lowest sub-queue until the lowest sub-queue becomes full, and then storing items in successively next higher sub-queues in the hierarchy as each next higher sub-queue becomes full;
   removing, by the controller, an item from the queue by removing an item that is ready for removal from an entry in the lowest sub-queue; and
   shifting, by the controller, items stored in sub-queues in the hierarchy to fill the entry in the lowest sub-queue by, starting from the lowest sub-queue and proceeding through sub-queues in the hierarchy, for each sub-queue:
      when a next higher sub-queue in the hierarchy exists and stores at least one item, determining, using the age matrix associated with the next higher sub-queue, an entry in which an oldest item in the next higher sub-queue is stored; and
      moving the oldest item from the entry in the next higher sub-queue into that sub-queue.

15. The method of claim 14, wherein:
   the elements in each age matrix are arranged in rows and columns;
   the elements in each row and column are associated with a different entry in a corresponding sub-queue; and
   each element is configured to store a value that indicates whether the entry in the corresponding sub-queue associated with the row is older than the entry in the corresponding sub-queue associated with the column.

16. The method of claim 15, wherein determining, using an age matrix associated with a given sub-queue, an entry in which an oldest item in the given sub-queue is stored includes:
   determining, by the controller, values for elements in rows and columns of the age matrix on the second side of the reflecting line of the age matrix using the values of elements in rows and columns on the first side of the reflecting line;
   determining, by the controller, a particular column in the age matrix associated with the given sub-queue that best meets a specified criteria for the values in the column; and
   identifying, by the controller, based on the particular column in the age matrix, the entry in the given sub-queue in which the oldest item is stored.

17. The method of claim 15, wherein storing items in a given sub-queue includes:
   storing, by the controller, an item in an available entry in the given sub-queue; and
   updating, by the controller, the age matrix associated with the given sub-queue, the updating including:
      setting, to a first value, elements in a column in the age matrix on the first side of the reflecting line that are associated with the entry in the given sub-queue; and
      setting, to a second value, elements in a row in the age matrix on the first side of the reflecting line that are associated with the entry in the given sub-queue.

18. The method of claim 17, wherein, when a particular entry in a given sub-queue presently stores no item, setting, by the controller, a valid indicator for the elements in a column in the age matrix associated with the particular entry to indicate that the elements in that column are invalid and thus are not to be used.

19. The method of claim 17, wherein storing items in a given sub-queue includes storing an item in any available entry in the given sub-queue regardless of the ages of items stored in other entries in the given sub-queue.

20. The method of claim 15, wherein some or all of the sub-queues in the hierarchy have different numbers of entries than other sub-queues in the hierarchy.

21. The method of claim 15, wherein determining, using an age matrix associated with a given sub-queue, an entry in which an oldest item in the given sub-queue is stored includes:
   determining, by the controller, values for elements in rows and columns of the age matrix on the second side of the reflecting line of the age matrix using the values of elements in rows and columns on the first side of the reflecting line;
   determining, by the controller, a particular row in the age matrix associated with the given sub-queue that best meets a specified criteria for the values in the column; and
   identifying, by the controller, based on the particular row in the age matrix, the entry in the given sub-queue in which the oldest item is stored.

22. The method of claim 15, wherein storing items in a given sub-queue includes:
   storing, by the controller, an item in an available entry in the given sub-queue; and
   updating, by the controller, the age matrix associated with the given sub-queue, the updating including:
      setting, to a first value, elements in a row in the age matrix on the first side of the reflecting line that are associated with the entry in the given sub-queue; and
      setting, to a second value, elements in a column in the age matrix on the first side of the reflecting line that are associated with the entry in the given sub-queue.

23. The method of claim 22, wherein, when a particular entry in a given sub-queue presently stores no item, setting, by the controller, a valid indicator for the elements in a row in the age matrix associated with the particular entry to indicate that the elements in that column are invalid and thus are not to be used.

24. The method of claim 14, wherein removing the item that is ready for removal from the entry in the lowest sub-queue includes:
  removing, by the controller, the item from the lowest sub-queue regardless of an age of the item, so that the item that is younger than an oldest item in the lowest sub-queue may be removed out of order with respect to the oldest item.

25. The method of claim 14, wherein the method further comprises:
  removing, by the controller, one or more other items from the queue when removing the item from the queue so that at least two items are removed from the queue in a same removal operation, the removing comprising removing one or more other items that are ready for removal from one or more other entries in the lowest sub-queue; and
  shifting, by the controller, along with shifting the items for filling the entry in the lowest sub-queue, other items in the sub-queues to fill the one or more other entries in the lowest sub-queue.

26. The method of claim 14, wherein items are only removed from the lowest sub-queue of the queue.

* * * * *